March 26, 1946.    S. G. BRADY    2,397,086
METHOD AND APPARATUS FOR CUTTING KEYWAYS
Filed Sept. 27, 1943    3 Sheets-Sheet 1

INVENTOR.
Samuel G. Brady
BY
Whittemore Hulbert + Belknap
ATTORNEYS

March 26, 1946.  S. G. BRADY  2,397,086
METHOD AND APPARATUS FOR CUTTING KEYWAYS
Filed Sept. 27, 1943  3 Sheets-Sheet 2

INVENTOR.
Samuel G. Brady
BY
Whittemore Hulbert + Belknap
ATTORNEYS

March 26, 1946.  S. G. BRADY  2,397,086
METHOD AND APPARATUS FOR CUTTING KEYWAYS
Filed Sept. 27, 1943  3 Sheets-Sheet 3
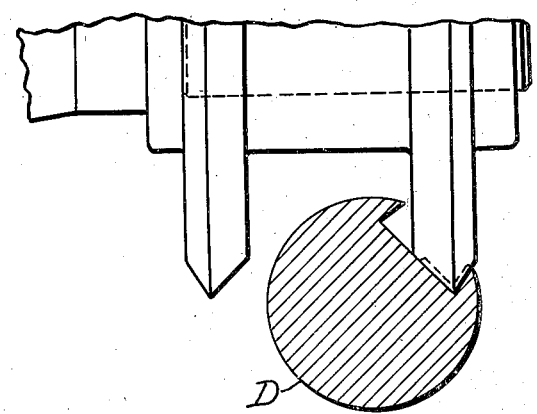
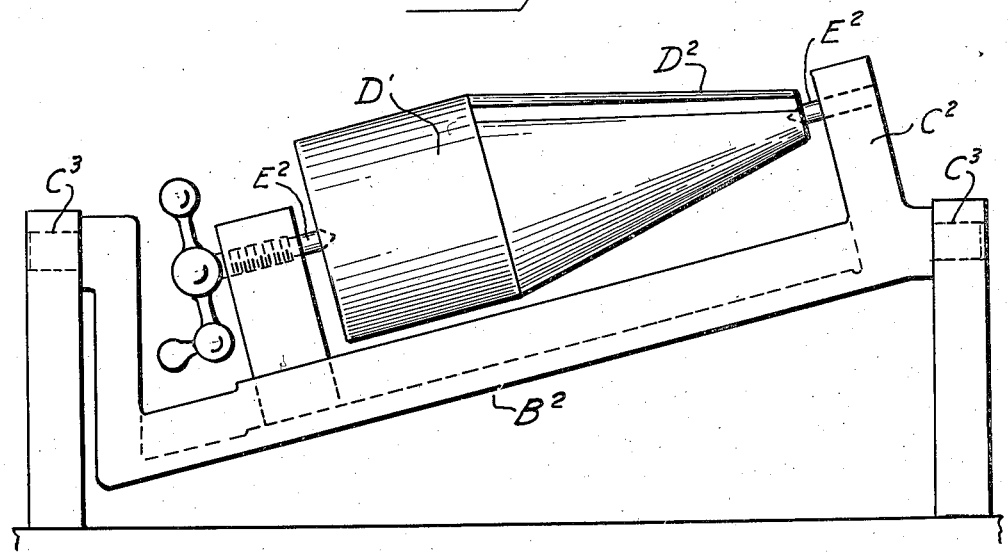
INVENTOR.
Samuel G. Brady
BY
ATTORNEYS Patented Mar. 26, 1946

2,397,086

UNITED STATES PATENT OFFICE 2,397,086

METHOD AND APPARATUS FOR CUTTING KEYWAYS

Samuel G. Brady, Royal Oak, Mich., assignor to The Gear Grinding Machine Company, Hamtramck, Mich., a corporation of Michigan Application September 27, 1943, Serial No. 503,991

7 Claims. (Cl. 90—11)

The invention relates to method and apparatus for cutting keyways and it is the primary object of the invention to expedite the work and to secure great accuracy in the performance thereof. It is a further object to cut keyways which are non-parallel to the axis of the shaft or member in which the keyway is formed. Still further, it is an object to cut keyways, the sides of which are either parallel or non-parallel, and in some instances are undercut. With these and other objects in view, the invention consists in the method and apparatus as hereinafter set forth.

In the drawings:

Fig. 5 is a similar view illustrating the cutting of a keyway with non-parallel undercut sides.

Fig. 6 is a view similar to Fig. 1 illustrating the cutting of a keyway that is non-parallel to the axis of rotation of the shaft.

Figure 1:
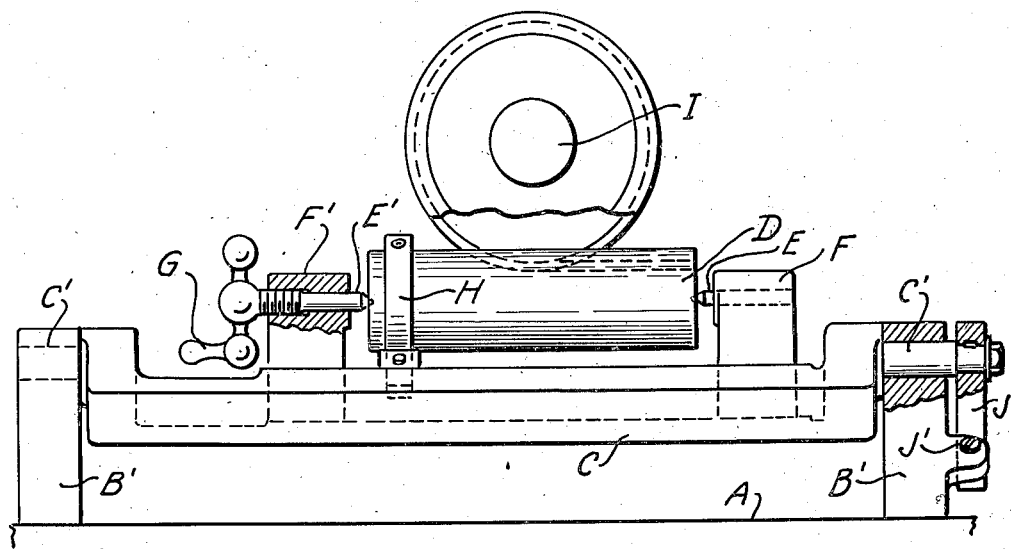
Fig. 1 is a side elevation of one form of apparatus for the cutting of keyways by my improved method.
Figure 2:
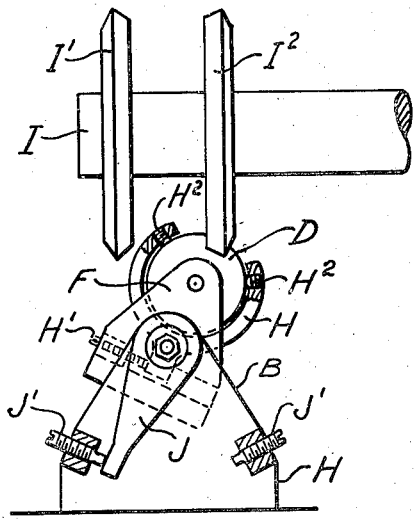
Fig. 2 is an end elevation thereof.

My improved method may be carried out by the use of rotary cutters which may be either milling cutters or grinders. However, it is essential that these cutters should be so fashioned as to be capable of sharpening or retrimming to preserve the desired contour and so as to produce a corresponding contour in the work which is not affected by the sharpening or trimming. One form of apparatus which may be employed is illustrated in Fig. 1 in which A is the movable table or carriage of a machine tool. B is a work holder comprising a pair of spaced standards B' mounted on the table A and a rockable member C extending between said standards provided at its opposite ends with trunnions C' engaging bearings in said standards. The work, which as shown, is a shaft D, is mounted on centers E and E' respectively in head and tail stocks F and F' on the rockable member C. The tail stock may, if desired, be adjustable on the member C to accommodate shafts of different lengths and the center E' is also adjustable by a handle G. A segmental clamp H partially embraces the shaft D and is secured to the member C by a set screw H'; also set screws H² in the clamp hold the shaft from rotation. I is a rotary arbor extending transversely to the axis of the shaft D and having mounted thereon a pair of spaced rotary cutters I' and I². One of the trunnions C' has secured thereto an arm J for rocking the member C and adjustable screws J' engaging bearings on the standard B' serve to accurately limit the amount of angular adjustment permitted to the arm J.

My improved method comprises essentially the cutting of the opposite sides and also the bottom of the keyway by spaced rotary cutters, the cutting edges of which lie in conical surfaces of revolution. Thus without regard to whether the side walls of the keyway are parallel or non-parallel, the cutters therefore are in non-parallel conical surfaces of revolution. This permits of sharpening (in case a milling cutter is used) or trimming (in the case of a grinder) without altering either the angle of or the distance between the spaced cutters. It is, however, necessary that the cutting edges or surfaces of each cutter be equally spaced from the horizontal and vertical center lines of oscillation. For example, by referring to Fig. 3 the surfaces $I^3$ and $I^4$ of both cutters I' and I² must be equally spaced from the center lines of the trunnions C'. Also, it is necessary to have the cutters spaced from each other so that when one is in engagement with the work the other will entirely clear the work. Furthermore, it is necessary that in transferring the work from engagement with one cutter to engagement with the other, it should be rocked through an angle which is equal to the angle between the conical faces of the cutters plus or minus the angle between the sides of the keyway to be cut. For instance, if the sides of the keyway are parallel then the angle through which the work is rocked must be exactly equal to the angle between the conical surfaces of the two cutters. One the other hand, if the sides of the keyway are non-parallel, then the angle of rocking must be either greater or less than the angle between the conical surfaces of the cutters according to whether the sides of said keyway are undercut or flaring. The bottom surfaces of the keyways are fashioned by conical cutting surfaces on each cutter of a width at least half the width of the keyway but not extended sufficiently to interfere with the opposite side.

Figure 3:
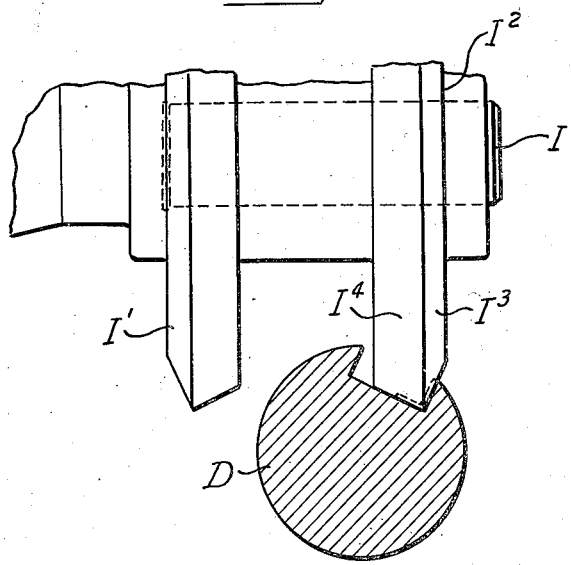
Fig. 3 is a view on a larger scale of a portion of Fig. 2.
Figure 4:
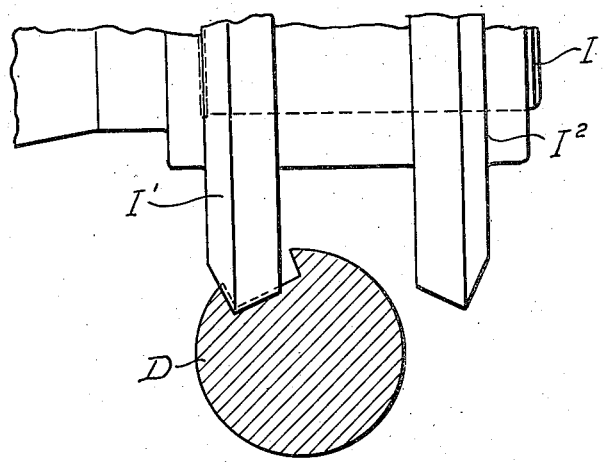
Fig. 4 is a view similar to Fig. 3 showing the work in a different position of adjustment.

As illustrated in Fig. 3, the cutter I² has cutting edges in a conical surface of revolution $I^3$ and also in the conical surface of revolution $I^4$. The surface $I^3$ is at an angle to the plane of rotation which is one half the angle between said surface and the corresponding surface of the cutter I'. The axis of the trunnions C' lies in a plane parallel to and midway between the central planes of the cutters I', I². Also the position of this axis is such that in rocking the work from the position shown in Fig. 3 to the position shown in Figure 4 the rock arm J will swing through the exact angle required. This angle may be exactly determined by adjustment of the stop screws J and J' on the standard B'. It will be noted that in each of these positions the work operated on by one cutter clears the other cutter. Also, that each cutter clears the opposite side wall of the keyway and that the conical cutting surface $I^4$ which forms the bottom of the keyway is more than half the width of said keyway. Consequently after completing the work in one position the work performed by the second cutter in the other position will complete the keyway which will be of exact dimensions in width and depth.

Fig. 5 illustrates the cutting of the keyway, the opposite side walls of which are undercut and therefore non-parallel to each other. This merely requires that the conical cutting surfaces of the cutters should be formed at the proper angles to each other as previously described.

It is sometimes necessary to cut a keyway in a conical or tapering portion of a shaft, said keyway being parallel to said tapering surface. For accomplishing such work the holder B is modified as illustrated at $B^2$, Fig. 6. The shaft D' having a conical or tapering portion $D^2$ is mounted upon centers $E^2$ in a rockable member $C^2$. The trunnions $C^3$ on the member $C^2$ have their axis at an angle to the axis of the centers $E^2$ corresponding to the angle between the tapering surface $D^2$ and the axis of the shaft D'. The parts are also proportioned so that the member $C^2$ will be rocked through the proper angle in transferring the work from the position of engagement with one cutter to that for the other cutter. The operation of cutting the keyway is then carried out in the same manner as previously described.

While I have described the cutting of keyways, it is obvious that the method and apparatus may be used for cutting grooves or channels suitable for any purpose as well as that for receiving keys or splines.

What I claim as my invention is:

1. In a method of cutting keyways or the like, the steps of presenting the work successively to spaced rotary cutters having their cutting edges in conical surfaces of revolution which are at opposite predetermined angles to the common plane of rotation thereof, the spacing of said cutters being sufficient to provide clearance for the outer peripheral surface of the work from interference with one cutter while the other cutter is operatively engaged with the work to cut a side surface of the keyway therein, and in rocking the work from one operative position to the other about an axis between said cutters other than the axis of the work so positioned that the angle of rocking movement is equal to the angle between said conical faces plus or minus the angle to each other of the opposite sides of the keyway to be cut.

2. An apparatus for cutting keyways or the like comprising two spaced rotary cutters having their cutting edges in conical surfaces of revolution which are at opposite predetermined angles to the common plane of rotation thereof, the spacing of said cutters being sufficient to provide clearance for the outer peripheral surface of the work from interference with one cutter while the other cutter is operatively engaged with the work to cut a side surface of the keyway therein, and in a rockable work holder for carrying the work from one operative position to the other, the axis of said holder being other than the axis of the work and so positioned that the angle of rocking movement is equal to the angle between said conical faces plus or minus the angle to each other of the opposite sides of the keyway to be cut.

3. An apparatus for cutting keyways or the like having undercut opposite side faces comprising spaced rotary cutters having their cutting edges in conical surfaces of revolutions which are at opposite predetermined angles to the common plane of rotation thereof, the spacing of said cutters being sufficient to provide clearance for the outer peripheral surface of the work from interference with one cutter while the other cutter is operatively engaged with the work to cut a side surface of the keyway therein, and a rockable work holder for carrying the work from one operative position to the other, the axis of said work holder being other than the axis of the work and so positioned that the angle of rocking movement is equal to the angle between said conical faces plus the angle to each other of the opposite undercut sides of the keyway.

4. An apparatus for cutting keyways or the like comprising spaced rotary cutters for successively engaging the work and having their cutting edges for forming the opposite sides of the keyway in conical surfaces of revolution which are at opposite predetermined angles to the common plane of rotation thereof, said cutters also having cutting edges in conical surfaces of revolution which respectively are at an angle to the aforesaid conical surfaces equal to the angle between the bottom and side of the keyway, the width of said last mentioned conical surfaces being at least equal to half the width of the keyway but being limited to avoid interference with the opposite side of the keyway and the width of spacing of said cutters being sufficient to completely clear the work by the one when the other is in action, and a rockable work holder for carrying the work from one operative position to the other, the axis of said holder being other than the axis of the work and so positioned that the angle of rocking movement is equal to the angle between said first mentioned conical faces plus or minus the angle to each other of the opposite sides of the keyway to be cut.

5. An apparatus for cutting keyways or the like comprising spaced rotary cutters for successively engaging the work and having their cutting edges in conical surfaces of revolution which are at opposite predetermined angles to the common plane of rotation thereof, one of said cutters having cutting edges for one side of the keyway in one conical surface and cutting edges for a portion of the bottom of the keyway in another conical surface, and the second cutter having cutting edges in a conical surface for forming the opposite side of the keyway and cutting edges in another conical surface for forming another portion of the bottom of the keyway, the width of the portions of each of said cutters for forming the bottom of the keyway being at least equal to half the width of the keyway, but being restricted to avoid interference with the opposite side of the keyway and the width of spacing of said cutters being sufficient to completely clear the work by the one when the other is in action, and a rockable work holder for carrying the work from one operative position to the other, the axis of said work holder being other than the axis of the work and so positioned that the angle of rocking movement is equal to the angle between said conical surfaces for forming the opposite sides of the keyway plus or minus the angle to each other of said opposite sides.

6. An apparatus for cutting keyways or the like comprising spaced rotary cutters having their cutting edges in conical surfaces of revolution which are at opposite predetermined angles to the common plane of rotation thereof, the spacing of said cutters being sufficient to provide clearance for the outer peripheral surface of the work from interference with one cutter while the other cutter is operatively engaged with the work to cut a side surface of the keyway therein, a work holder, trunnions for supporting said work holder having an axis other than the axis of the work so positioned that in rocking to carry the work from one operative position to the other the angle of movement is equal to the angle between said conical surfaces plus or minus the angle to each other of the opposite sides of the keyway, and stops for limiting the rocking movement of said holder to the said angle.

7. An apparatus for cutting keyways or the like in tapering portions of rotary members comprising spaced rotary cutters having their cutting edges in conical surfaces of revolution which are at opposite predetermined angles to the common plane of rotation thereof, the spacing of said cutters being sufficient to provide clearance for the outer peripheral surface of the work from interference with one cutter while the other cutter is operatively engaged with the work to cut a side surface of the keyway therein, and a rockable work holder for carrying the work from one operative position to the other, the axis of said holder being other than the axis of the work and parallel to the tapering surface of the work and being so positioned that the angle of rocking movement is equal to the angle between said conical faces plus or minus the angle to each other of the opposite sides of the keyway.

SAMUEL G. BRADY.